Sept. 25, 1928.

F. A. ROWE 1,685,725

SPECTACLES

Filed Dec. 14, 1926

INVENTOR
FREDERICK AUGUSTUS ROWE

By

ATTORNEYS

Patented Sept. 25, 1928.

1,685,725

UNITED STATES PATENT OFFICE.

FREDERICK AUGUSTUS ROWE, OF VANCOUVER, BRITISH COLUMBIA, CANADA.

SPECTACLES.

Application filed December 14, 1926. Serial No. 154,807.

My invention relates to improvements in spectacles which are particularly adapted for the use of motorists or others who are required to face the glare of sunlight or oncoming headlights. The objects of the invention are to provide a very convenient means whereby a translucent lens or screen may be interposed instantaneously between the eye of the wearer and a light ray to prevent the wearer from being dazzled thereby, and to provide means whereby an unrestricted view is obtainable when desired. A further object is to provide means whereby said translucent screen may be so disposed as to dim the rays from the sun or other light which may be to one side of the wearer and at the same time provide an unrestricted view ahead.

The invention consists essentially of a pair of spectacles having the eyepieces fitted with translucent half lenses which are preferably hinged on one side and are capable of being swung outwardly at an angle from the vertical plane of the spectacle frame, and means for forming the bridge of the frame permitting the spectacles to be worn in inverted position, as will be more fully described by the following specification, in which:—

In the drawings like characters of reference indicate corresponding parts in each figure.

Figure 1:
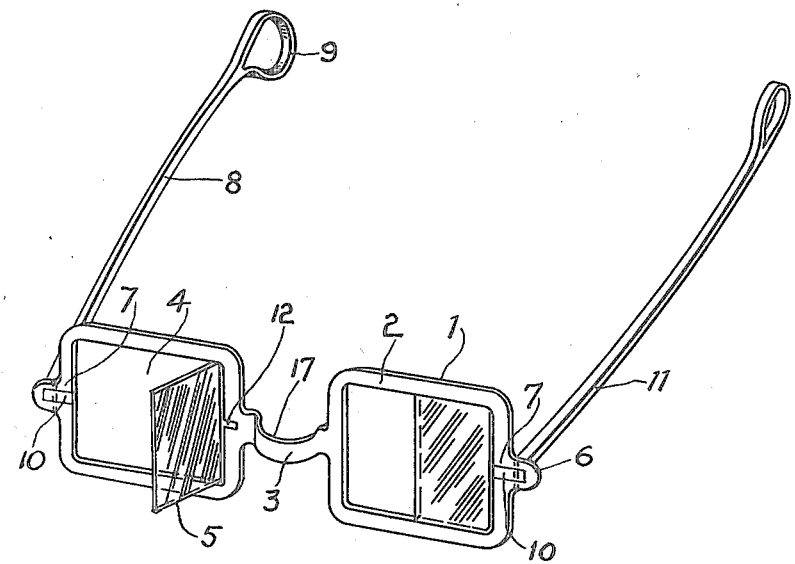
Fig. 1 is a perspective view of the invention.
Figure 2:
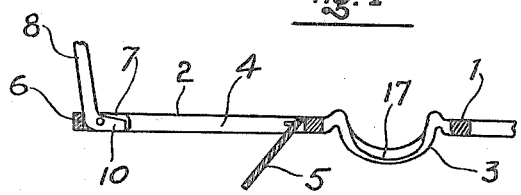
Fig. 2 is an enlarged sectional view showing one of the lenses set at an angle from the frame.
Figure 3:
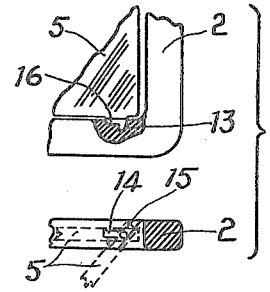
Fig. 3 is a fragmentary elevational and sectional view (enlarged) showing the means for holding the lenses in alternate positions.
Figure 4:
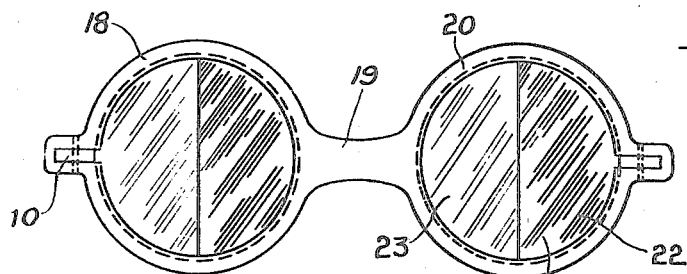
Fig. 4 is an elevational view of a modified form of the invention.

The numeral 1 indicates generally a spectacle frame having a pair of eye pieces 2 and a bridge 3. The eye pieces 2 are made of sheet material of appreciable thickness and provided with rectangular openings 4 for the reception of the lenses 5. In the preferred construction here shown, each eyepiece is provided with a projecting portion 6 which is slotted as at 7 from the opening 4 to form a half hinge for a hingingly mounted temple 8. The temple is provided at its outer end with a loop 9 the sides of which are adapted to project an equal distance above and below the longitudinal axis thereof, so that when the spectacles are worn in inverted position the set or angle of the frame will be unaltered. At the forward end of the temple, a right angular extension 10, see Figs. 1, 2 and 4, is provided, which is adapted to fill the slot 7 when the spectacles are in use and the temples disposed at a right angle to the frame 2 as at 11. The slotted extension 6 to the left eyepiece provides an elasticity to the eyepiece which enables it to be expanded vertically to a slight extent that the lenses 5 may be sprung into position therein, and as such expansibility is required to the right eyepiece a horizontal slot 12 is formed in its left vertical member adjacent the bridge. The horizontal members of the eyepieces 2 are each provided with recesses 13 for the purpose of receiving the pivot pins of the lenses 5 and two grooves indicated by the numerals 14 and 15 respectively (see Figure 3) are formed in the lower horizontal members adjacent or intersecting the recesses 13, the groove 14 being in alignment with the spectacle frame and the groove 15 being at an angle, preferably 45 degrees thereto. Each lens 5 is provided with a pair of projecting pins which may be formed integrally therewith when celluloid or other similar material is used, said pins forming pivots adapted to set into the recesses 13. Extending from the lower pin 13 along the edge of each lens a small projection 16 is provided, which is preferably V-shaped in cross section so as to form a stop capable of engaging either of the grooves 14 or 15 to hold the lens in adjusted position within the frame or at an angle thereto. The bridge 3 of the frame 1 is disposed upon the horizontal axis of the frame and is outwardly curved and bevelled upon its inner lower and upper edges as at 17, so that the spectacles may be worn as shown with the lenses to the left of the eye pieces or inverted to dispose the lenses to the right of the eyepieces.

In the modification shown in Figure 4, the numeral 18 indicates a spectacle frame having a centrally disposed bridge 19 to permit of the spectacles being worn in inverted position, and a pair of eyepieces 20 fitted with lenses 21, which lenses are divided vertically to form a translucent half lens 22 and a transparent half lens 23.

Having thus described the several parts of my invention I will now briefly explain its use.

When using the spectacles for night driving and in countries where the rule of the road is to drive to the right, the spectacles would be used with the translucent lenses 5 covering the left side of the eyepieces 2. The lenses may be used in position within the eyepieces or at an angle thereto according to the desire of the user, though the latter would be generally more suitable. When driving without having to encounter the glare of oncoming headlights, the head would be turned very slightly to the left so as to dispose the pupils of the eyes to the side of the lenses and afford a clear vision, and on the approach of a vehicle having bright headlights, the head would be turned slightly to the right so as to interpose the translucent lenses between the eyes and the oncoming glare.

When driving towards the sun, the lenses would be disposed within the eyepieces and the head so turned as for meeting oncoming headlights, but if the sun were at an angle to the line of travel, the spectacles would be worn with the lenses either to the right or left of the eyes and disposed at an angle to the plane of the spectacle frame, thus affording a clear and unobstructed view of the road ahead, but screening the severe glare of the sun from the wearer's eyes.

It will thus be seen that I have invented a pair of spectacles which can be used to protect the wearer against glare from in front, to the right or to the left while leaving a clear and unobstructed view therethrough.

What I claim as my invention is:

1. A spectacle comprising an eye piece in the form of an expansible rectangular frame having pintle sockets provided in the upper and lower inner edge portions of the frame, there being angularly related grooves formed in the said inner edge portions of the frame in immediate proximity to each of said sockets, and a rectangular lens having upper and lower pintles insertable in said sockets when the frame is expanded to the required extent, the edge portions of the lens adjacent to the pintles being selectively engageable in said grooves and adapted to be yieldingly retained in said grooves by the resilient gripping pressure of the frame.

2. A spectacle of the character described comprising a pair of open rectangular frames connected by a bridge disposed midway between the upper and lower edges of the frames to permit the spectacle to be worn in normal or inverted position, a rectangular half lens pivotally mounted in each of said frames, means formed in the frames adapting the same for expansion or contraction and serving to impart resiliency thereto, each frame being provided with angularly related grooves in the upper and lower portions thereof adapted to be selectively engaged with the upper and lower edge portions of the half lens whereby the latter may be held in either of two adjusted positions by the resilient gripping pressure of the frame.

3. A spectacle of the character described having an eye piece in the form of an open rectangular frame, one end member of said frame being enlarged laterally at a point intermediate its length and formed with a slot in said enlarged portion to permit resilient expansion and contraction of the frame, and a rectangular half lens adapted to fill one half of the frame and to be yieldingly gripped between the upper and lower frame members, there being angularly related grooves formed in said upper and lower frame members and selectively engageable with the upper and lower edges of the half lens to retain the latter in different positions of adjustment.

Dated at Vancouver, B. C., this 7th day of December, 1926.

FREDERICK AUGUSTUS ROWE.